United States Patent Office 3,057,930
Patented Oct. 9, 1962

3,057,930
ALCOHOL STABILIZATION
William A. Dimler, Jr., Colonia, Alan A. Schetelich, Cranford, and John J. Murphy, Jr., Bayonne, N.J., assignors to Esso Research and Engineering Company, a corporation of Delaware
No Drawing. Filed Mar. 28, 1958, Ser. No. 724,497
11 Claims. (Cl. 260—632.5)

This invention relates to the stabilization of alcohols contaminated with carbonyl compounds and/or unsaturated compounds, e.g. olefins, by the use of certain additives whereby plasticizer esters having improved color properties may be obtained. More specifically, this invention relates to the use of certain boron compounds as color inhibitors in the preparation of plasticizer esters.

The ever expanding use of plasticizer materials such as vinyl chloride polymers or copolymers, polyvinyl acetate cellulose esters, acrylate and methacrylate resins, rubbers such as the emulsion copolymers of butadiene and styrene and acrylonitrile or the copolymers of isobutylene with small amounts of a diolefin such as isoprene, has created a large demand for suitable plasticizers. Branched chain alkyl organic esters and particularly alkyl phthalic acid esters and more particularly octyl and decyl phthalates, as well as the corresponding esters of maleic acid, adipic acid, azelaic acid, glycollic acid, sebacic acid or their anhydrides, have been known to be efficient plasticizers for the aforementioned high molecular weight materials. The phthalic esters, however, are characteristic of this aforesaid group and color problems resulting from the employment of contaminated alcohols will be observed regardless of the particular dibasic acid utilized in the esterification reaction. In general, therefore, the esterification reaction contemplated by this invention is between an organic dibasic acid and/or its anhydride with the desired alcohol.

The above plasticizer esters are generally prepared by the esterification of a suitable alcohol, e.g. $C_6$–$C_{16}$ with an acidic reactant such as phthalic acid, the anhydride thereof or any of the acidic reactants noted above. The alcohol is employed in amounts from stoichiometric to substantial excess and heated, in accordance with one known process in the presence of an acid catalyst such as benzene sulfonic acid, toluene sulfonic acid, naphthalene sulfonic acid or the like. Alternatively the acid and alcohol may be reacted at higher temperatures in the absence of any catalyst or sometimes with very small amounts of catalyst. Entrainers or azeotrope formers may be utilized in the reaction to effect the removal of water at lower temperatures. Entrainers usually employed are the low boiling aromatics such as benzene, toluene, xylene and the like, paraffinic hydrocarbons of suitable boiling points, e.g. heptene and octane or olefinic materials such as diisobutylene, etc. Other acid and alcohol reactants are known and are amply set forth in the abundant prior art.

One of the primary difficulties encountered in the manufacture of plasticizer esters, especially where $C_8$ and $C_{10}$ alcohols are employed, is the failure to obtain colorless products even when relatively high purity reactants are employed. It has been known for some time that sulfur contaminants result in off-color ester products and more recently it was discovered that carbonyl compounds such as aldehydes, acetals and various unsaturated compounds such as olefins, affect to a marked degree the color of the final ester product. To counteract the degradation of color resulting from these contaminants, many commercial esterification processes employ mild conditions and carefully control the reaction medium. Thus mild p-toluene sulfonic acid is often employed in lieu of sulfuric acid and the reaction mixture is kept free of oxygen usually by blanketing the system with $CO_2$ or other inert gases. Thermal esterification, on the other hand, results in color degradation of the product due to the contaminants in the reactants. Since no catalyst is used, higher temperatures necessarily are employed which result in off-test product depending on the amount of contaminant present.

A principal source of alcohols for the manufacture of plasticizer esters is via the oxo or carbonylation route where an olefin is reacted with carbon monoxide and hydrogen in the presence of a catalyst, generally a cobalt salt, at elevated temperatures and pressures to form an aldehyde product having one more carbon atom than the starting olefin. This aldehyde product is then freed of cobalt and subsequently hydrogenated to form the corresponding alcohol product. While the sulfur contaminants introduced into the product by either the olefin or the hydrogenation catalyst, etc., may be effectively cleaned up by caustic washing, extensive distillation and similar treatments, the final alcohol product obtained in general will contain sufficient amounts of contaminants to seriously affect the ultimate color characteristic of any ester prepared therefrom. The term "carbonyl compound" is employed herein to mean those compounds containing an aldehyde radical and those compounds which readily form aldehydic compounds. Oxo alcohols will contain generally from 0.01 to 1.0 wt. percentage or higher of carbonyl compounds. Dimer alcohols prepared by a modified oxo route are also valuable as intermediates in the preparation of esters and are subject to the same contamination problems as the ordinary oxo alcohols. Oxo octyl alcohol, or as it is commonly called "isooctyl alcohol," comprises major amounts of dimethyl-1-hexanol and minor amounts of methyl-1-heptanol and smaller amounts of miscellaneous branched alcohols. Oxo decyl alcohol also varies in isomeric composition; however, it comprises predominantly primary trimethyl heptanols.

Other oxo alcohols employable in the esterification reaction of this invention include isohexyl, tridecyl and the like. Although a single isomer may be separated from the oxo product, this is rarely done. The oxo alcohols are almost always employed in their natural combination of isomers as derived from the carbonylation synthesis. A list of typical isomeric alcohols obtained during the oxo process may be found on page 7 of the book entitled "Higher Oxo Alcohols" by Hatch, published by Enjay Co., 1957.

One potential commercial source of alcohols suitable for the preparation of plasticizers is via the alkyl metal route. This relatively new process comprises basically the addition of ethylene or other olefin onto a metal alkyl such as aluminum triethyl or aluminum triisobutyl to prepare high molecular weight aluminum trialkyl compounds which in turn may be oxidized to form the corresponding aluminum alcoholates and finally hydrolyzed to form the alcohol. The alcohols obtained via this new route also contain substantial quantities of carbonyl compounds which are either not separable from the alcohol or separable only with extensive costly treatment. Alternatively the alkyl metal may be made directly by reaction of olefin with metal and $H_2$. An alkyl metal of this type is easily converted to alcohols in the manner described above. This invention is amenable to the use of alcohols having the aforementioned contaminants regardless of how the alcohols are prepared.

It is therefore a primary object of this invention to treat the contaminated alcohols in a manner which will permit the preparation of plasticizer esters having improved color properties.

Without unduly lengthening the present specification and for the purpose of defining with more particularity some of the alcohol sources, reference may be had to U.S. Patent No. 2,637,746 to Parker, which describes in detail the oxo process, and to a copending commonly assigned application, Serial No. 578,902, now abandoned, which describes one process for preparing alcohols via the alkyl metal route.

It has now been found that amine boranes effectively stabilize carbonyl contaminated alcohols when contacted therewith in small amounts. These amine boranes range from liquid to solid at room temperatures and are known to react violently with concentrated acids, e.g. sulfuric acid. The amount of stabilizer employed will depend on the amount of contaminants present in the alcohol; however, for most practical purposes, employing an alcohol of reasonable purity, the stabilizer may be added in an an amount from 30 to 1000 p.p.m. based on alcohol. Although these amine boranes are known to be reactive with concentrated sulfuric acid, it has been found that the stabilized alcohol may be used in esterification reactions employing strong acids without deleterious effect. The stabilizers are effective upon contact to the extent that the color of the ester produced is substantially lighter than an ester prepared from a non-stabilized alcohol having the same contamination.

The amine boranes are characterized by the following formula:

$$R_3N:BH_3$$

where R is hydrogen, $C_1$–$C_8$ hydrocarbon radical, $C_1$–$C_8$ oxy hydrocarbon or alkanol radical and where the R's may form a cyclic compound with the nitrogen such as pyridine, wherein at least one of the R's is an organic radical. Thus the amine boranes may be primary, secondary or tertiary with hydrocarbon or oxy hydrocarbon substituents attached to the nitrogen atom. The following boranes are typical of those which may be employed in this process: mono, di and tri methylamine boranes; mono, di and tri ethylamine boranes; mono, di and tri propylamine boranes; higher (up to $C_8$) alkylamine boranes; mixed alkylamine boranes such as methylethylamine boranes as well as higher mixed amine boranes; mono, di and tri isopropanol amine boranes and mono, di and tri ethanol boranes, etc. Pyridine borane is a typical ring structured heterocyclic, although aromatic amine boranes such as the mono, di and tri phenylamine boranes are also useful.

The esterification process to which this invention relates comprises the reaction of about 2 to 4.0 moles of the alcohol described above per mole of the desired dicarboxylic acid or anhydride without acidic catalyst at 125 to 250° C. and preferably 160 to 225° C. for a period of at least about ½ hour. Reaction time may be as high as 8–10 hours in some cases. Atmospheric to slightly elevated pressures may be employed, if desired. Also, the reaction mixture may be blanketed under slight pressures by carbon dioxide, nitrogen or other inert gases to exclude oxygen. Acid catalysis may be employed, if desired, however, when carrying out such a reaction the temperatures will preferably be of a much lower order, e.g. 100 to 200° C. and more preferably between 130 to 160° C. and the reaction time may be somewhat shorter. The amount of acid catalyst employed may vary in accordance with its activity. For example, as little as 0.05 wt. percent on alcohol, if concentrated sulfuric acid is the catalyst, while as much as 7.0 wt. percent of toluene sulfonic acid, may be employed. Benzene, toluene or the like is generally employed to remove water as it is formed in an amount of 5 to 50 wt. percent based on alcohol.

EXAMPLE 1

To demonstrate the effectiveness of the novel color inhibitors, initial tests were carried out by heating 100 ml. of contaminated decyl alcohol obtained from the carbonylation reaction with 8 ml. of concentrated sulfuric acid. The alcohol was heated in the presence of the acid in a boiling water bath for 75 minutes and then rapidly cooled. Table I shows the results.

*Table I*

| Runs | $(CH_3)_2NH:BH_3$, p.p.m. (wt.) | $(CH_3)_3N:BH_3$, p.p.m. (wt.) | Color (Hazen) |
| --- | --- | --- | --- |
| 1 | | | 50 |
| 2 | | | 40 |
| 3 | | | 50 |
| 4 | 10 | | 50 |
| 5 | 25 | | 40 |
| 6 | 100 | | 30 |
| 7 | 500 | | 10 |
| 8 | | 10 | 40 |
| 9 | | 25 | 50 |
| 10 | | 100 | 25 |
| 11 | | 500 | 15 |

It will be noted that the blank runs 1, 2 and 3 employing no additive produced Hazen colors averaging between 40 and 50. Runs 4, 5, 6 and 7 employing dimethylamine borane showed marked improvement in Hazen color. Runs 8, 9, 10 and 11 showed similar results.

EXAMPLE 2

Esterifications were carried out in the presence of various amounts of acid catalyst and amine borane with the following results:

*Table II*

| | Esterification (Hazen) | |
| --- | --- | --- |
| | 0.33% $H_2SO_4$ (a) | 1.0% $H_2SO_4$ (b) |
| Oxo Decyl Alcohol (control) | 45 | 110 |
| Decyl Alcohol (inhibited with 0.05 wt. percent $(CH_3)_3N:BH_3$) | 5 | 35 |

(a) Esterification Conditions:
 1 mole phthalic anhydride.
 2.1 moles decyl alcohol.
 75 cc. benzene.
 Wt. percent catalyst as shown based on theoretical ester.
 Temp. 130° C.
(b) Esterification Conditions:
 1 mole phthalic anhydride.
 2.1 moles decyl alcohol.
 75 cc. toluene.
 Wt. percent catalyst as shown based on theoretical ester.
 Temp. 160° C.

It will be noted that a marked reduction in color was obtained by employing small amounts of the color inhibitor. Despite the fact that these color inhibitors are very unstable compounds in the presence of oxidizing agents such as sulfuric acid, no adverse effect was noted upon esterification of an alcohol containing stabilizing amounts of these compounds.

The alcohol to be stabilized may be treated in any number of ways as long as there is good contact between the color inhibitor and the alcohol. For example, the alcohol may be passed over a bed of the color inhibitor if it is a solid, or the solid may be added in proper amounts to the alcohol. Alternatively the solid amine borane may be dissolved in a suitable solvent such as ethers, hydrocarbons including benzene, toluene, hexane, heptane and the like as well as oxygenated solvents such as glacial acetic acid. Preferably, however, a solvent if employed should be unreactive during esterification and be easily separated from the ester product. If the color inhibitor is a liquid, it may be added as such to the alcohol or if desired employed with a solvent.

Although the stabilized alcohol which has been contacted with the novel color inhibitor of this invention may be employed as such for the esterification, if desired the color inhibitor may be removed from the alcohol by water washing or by scrubbing with any of the known solvents for these compounds. Removal of the color inhibitor from the alcohol does not render the alcohol unstable.

It may then be stored under substantially non-oxidizing conditions for any length of time desired.

What is claimed is:

1. A process for stabilizing an alcohol contaminated with minor amounts of carbonyl compounds which comprises contacting said contaminated alcohol with a stabilizing amount of an amine borane wherein the amine part of said borane is selected from a group consisting of alkyl amines having from 1 to 8 carbon atoms per alkyl group, alkanol amines having from 1 to 8 carbon atoms per alkanol group and pyridine, said stabilizing amount being sufficient to deactivate the carbonyl contaminants present in said alcohol.

2. A process in accordance with claim 1 wherein said amine borane is pyridine borane.

3. A process in accordance with claim 1 wherein said amine borane is dimethyl amine borane.

4. A process in accordance with claim 1 wherein said amine borane is trimethyl amine borane.

5. A process for stabilizing a contaminated oxo alcohol which comprises contacting said alcohol with an amine borane wherein the amine part of said borane is selected from the group consisting of alkyl amines having from 1 to 8 carbon atoms per alkyl group, alkanol amines having from 1 to 8 carbon atoms per alkanol group and pyridine, in an amount sufficient to improve the color of the alcohol.

6. A process in accordance with claim 5 wherein said amine borane is dimethyl amine borane.

7. A process in accordance with claim 5 wherein said amine borane is trimethyl amine borane.

8. A process in accordance with claim 5 wherein said amine borane is pyridine borane.

9. A process for stabilizing a carbonyl contaminated oxo alcohol of 6 to 16 carbon atoms per molecule which comprises dissolving in said alcohol 30–1000 parts per million, based on said alcohol, of an alkyl amine borane having from 1 to 8 carbon atoms per alkyl group.

10. A process in accordance with claim 9 wherein said amine borane is dimethyl amine borane.

11. A process in accordance with claim 9 wherein said amine borane is trimethyl amine borane.

References Cited in the file of this patent

UNITED STATES PATENTS

| | | |
|---|---|---|
| 1,681,238 | James | Aug. 21, 1928 |
| 2,525,354 | Hoog et al. | Oct. 10, 1950 |
| 2,614,072 | Carlson et al. | Oct. 14, 1952 |
| 2,614,128 | Mertzweiller | Oct. 14, 1952 |
| 2,681,904 | Hyer et al. | June 22, 1954 |
| 2,780,643 | Buchner | Feb. 5, 1957 |
| 2,822,409 | Gwynn et al. | Feb. 4, 1958 |

OTHER REFERENCES

Chaiken et al.: J. Am. Chem. Soc., 71, 122–5 (1949).
Nystrom et al.: J. Am. Chem. Soc., 71, 3245–6 (1949).